Jan. 31, 1967  N. LAING  3,301,003
AIR CONDITIONING APPARATUS
Filed Dec. 8, 1965  13 Sheets-Sheet 1
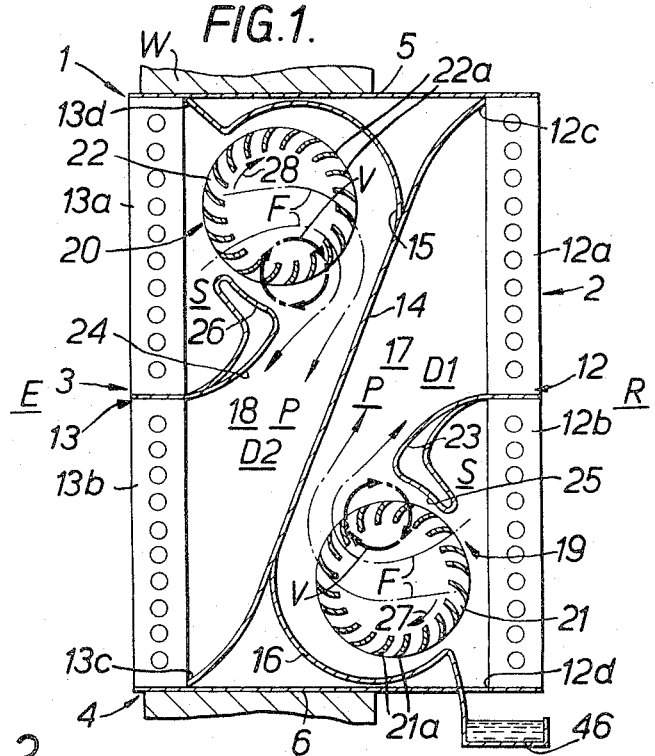
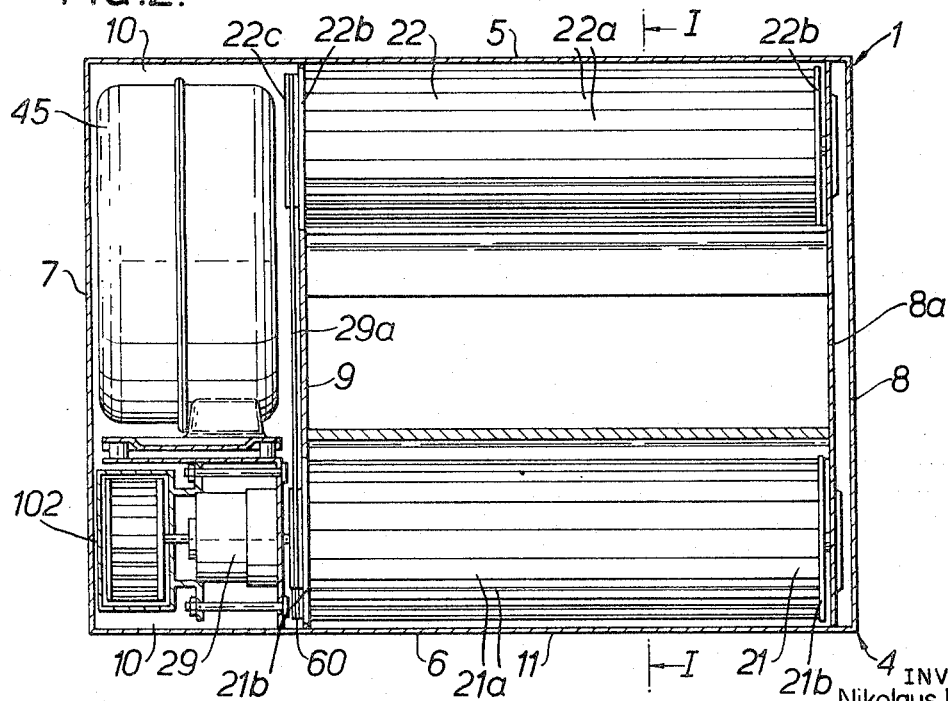
INVENTOR
Nikolaus Laing
BY
ATTORNEYS Jan. 31, 1967    N. LAING    3,301,003
AIR CONDITIONING APPARATUS
Filed Dec. 8, 1965    13 Sheets-Sheet 5

INVENTOR
Nikolaus Laing
BY
ATTORNEYS

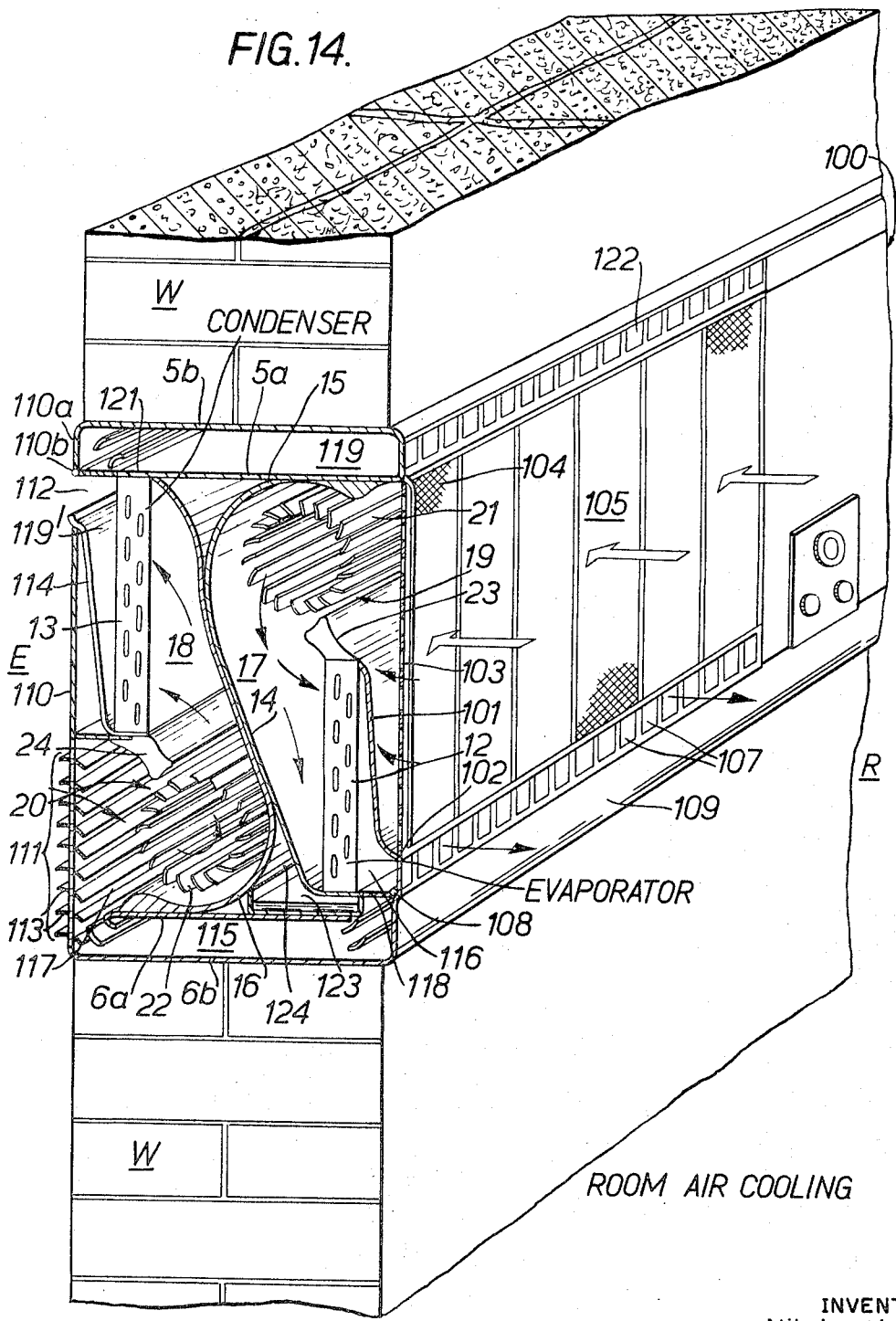

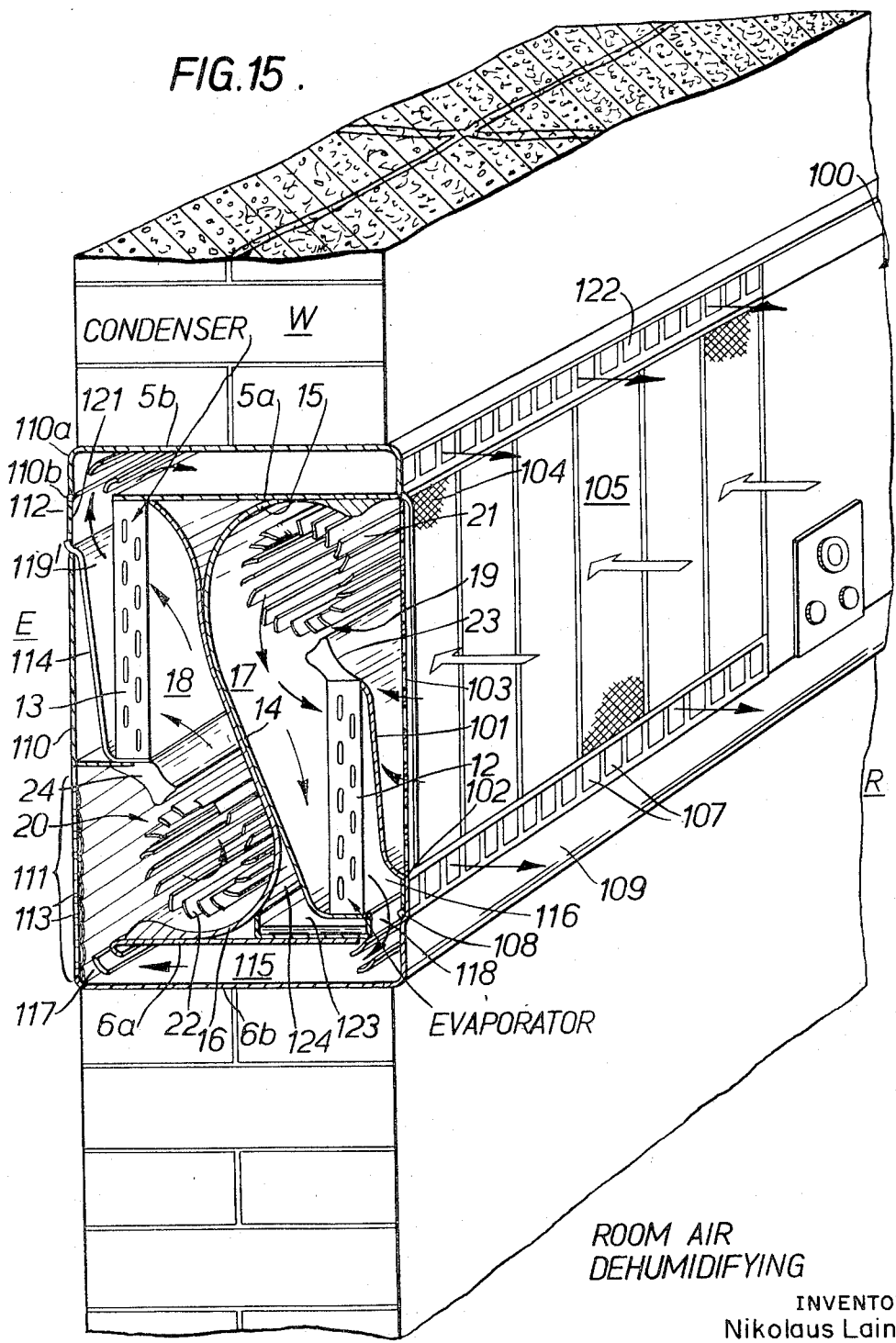

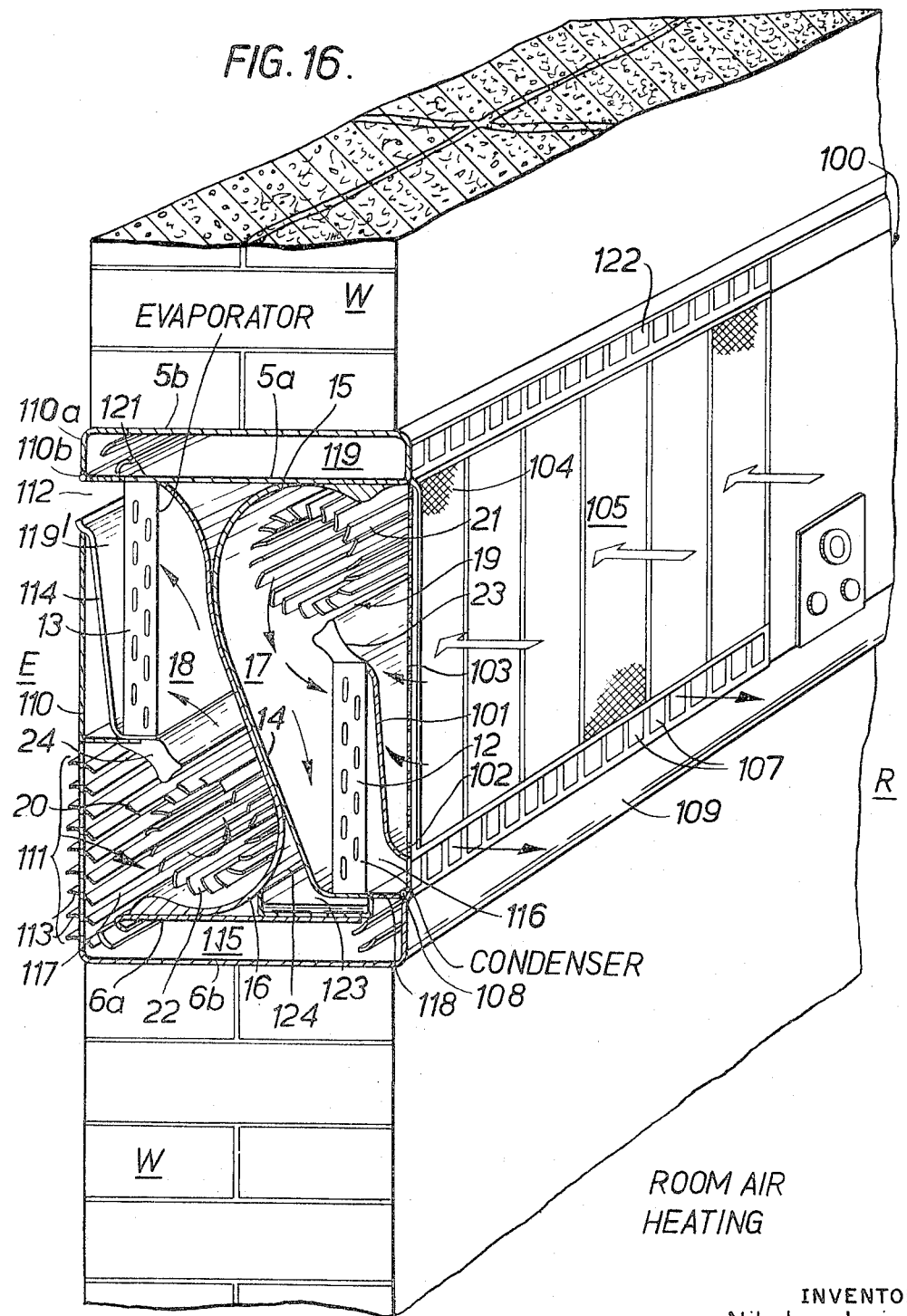

Jan. 31, 1967  N. LAING  3,301,003
AIR CONDITIONING APPARATUS
Filed Dec. 8, 1965  13 Sheets-Sheet 9
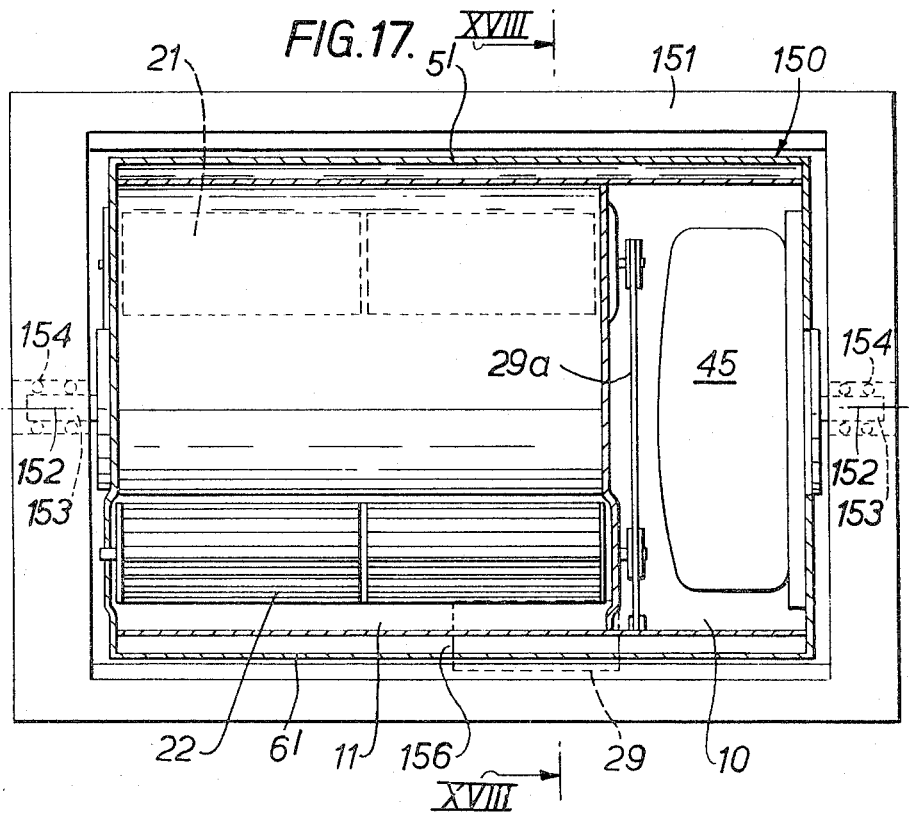
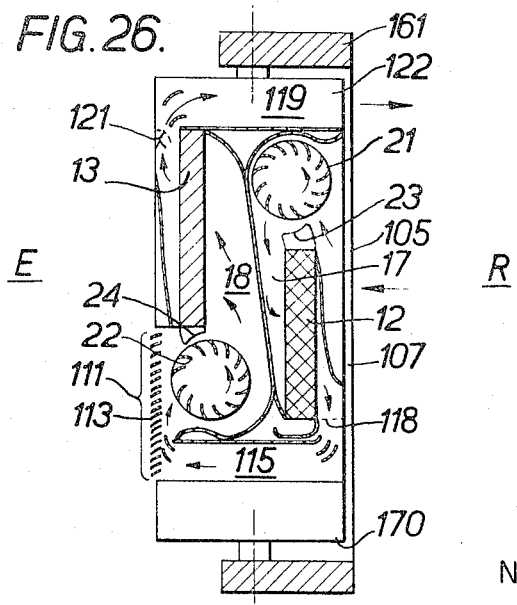
INVENTOR
Nikolaus Laing
BY
ATTORNEYS

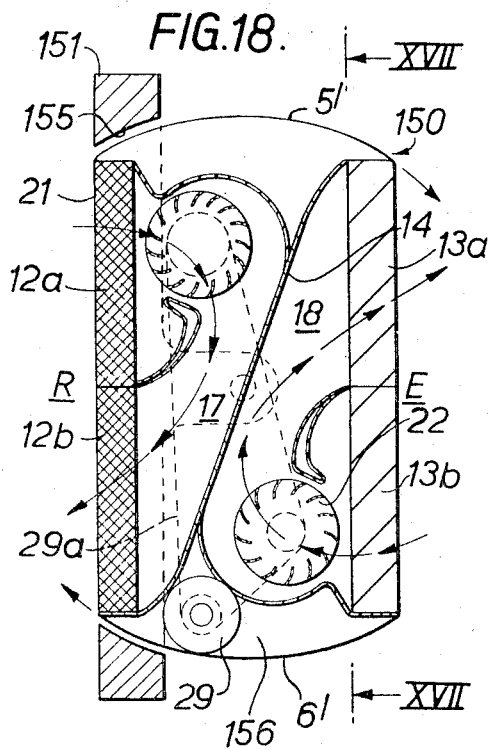
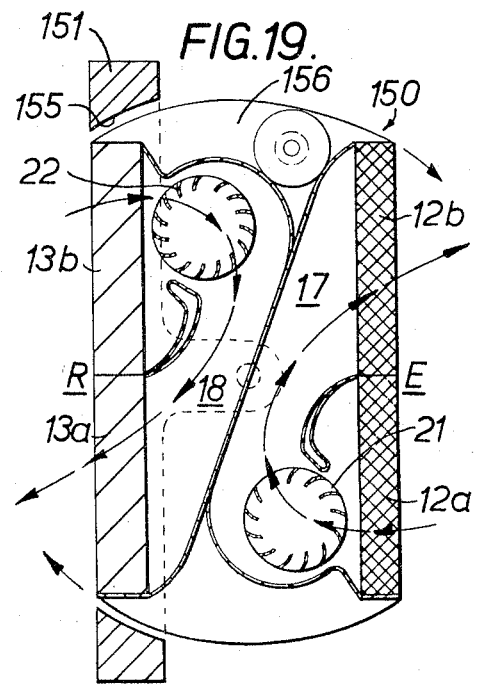

Jan. 31, 1967    N. LAING    3,301,003
AIR CONDITIONING APPARATUS
Filed Dec. 8, 1965    13 Sheets-Sheet 11
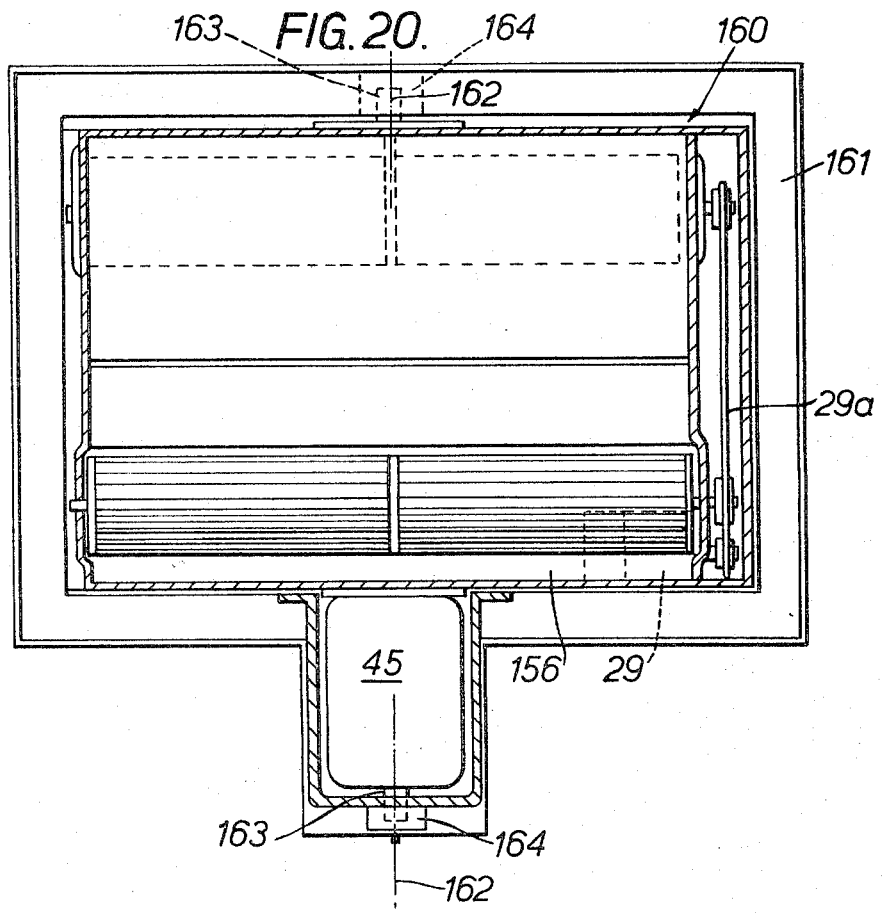
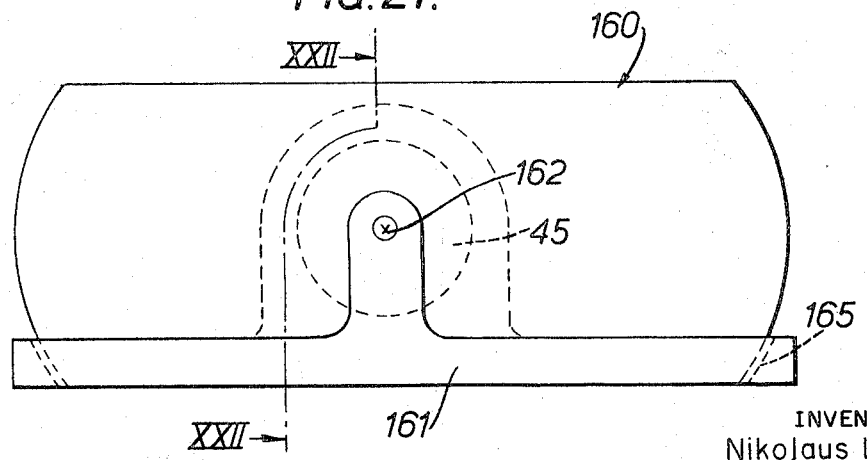
INVENTOR
Nikolaus Laing
BY
ATTORNEYS

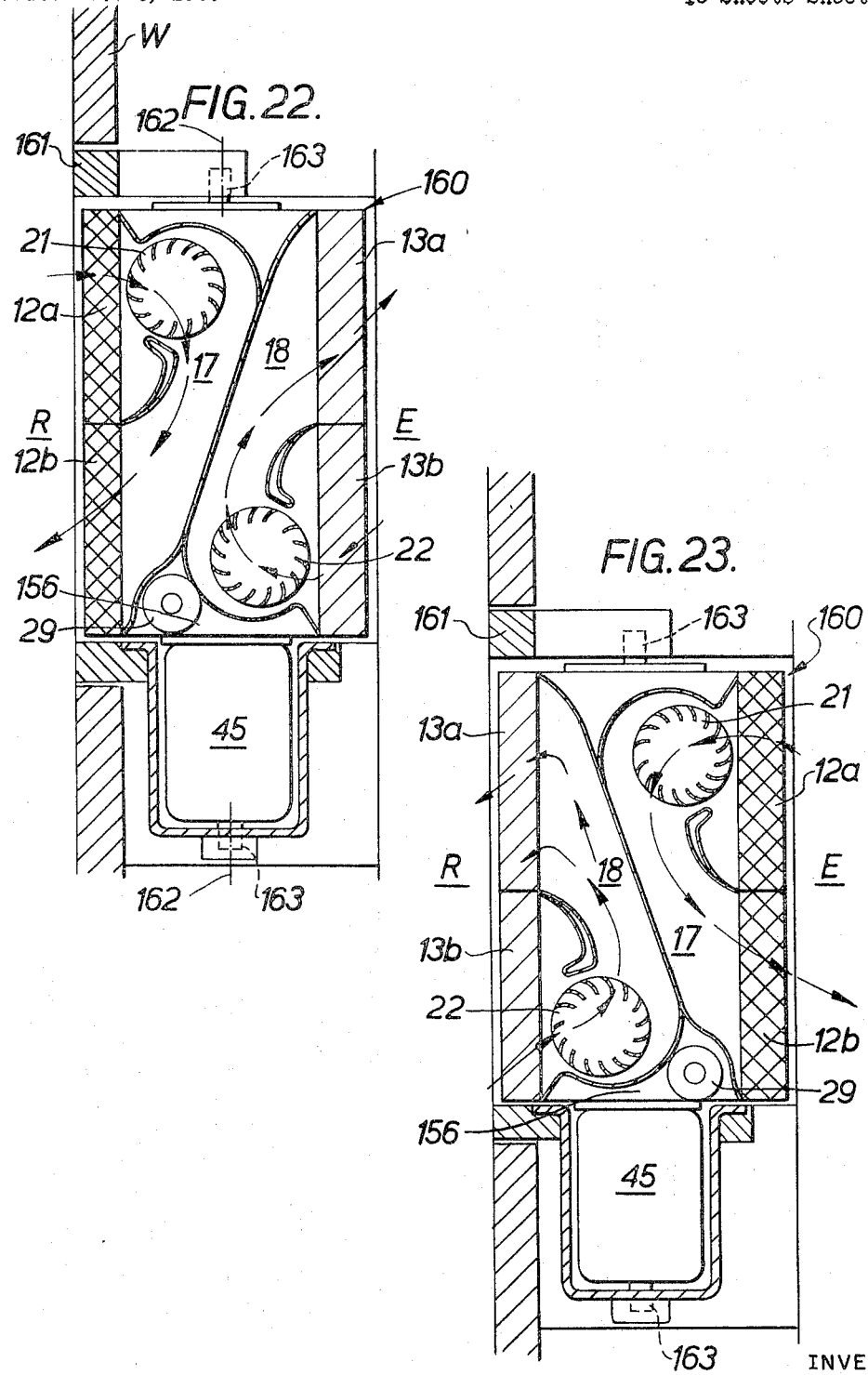

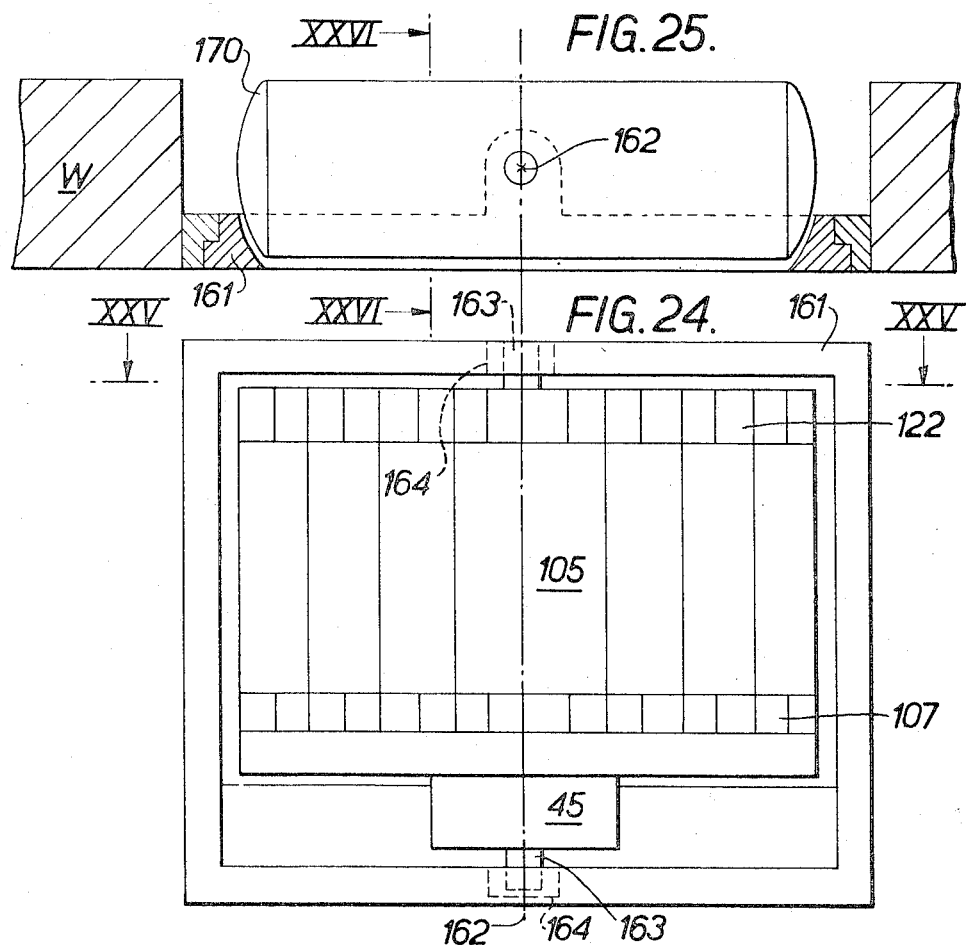

United States Patent Office 3,301,003
Patented Jan. 31, 1967

3,301,003
AIR CONDITIONING APPARATUS
Nikolaus Laing, Aldingen, near Stuttgart, Germany,
Filed Dec. 8, 1965, Ser. No. 512,465
Claims priority, application Germany, Dec. 9, 1964,
L 49,496
7 Claims. (Cl. 62—324)

This application is a continuation-in-part of application Serial No. 477,756, filed August 6, 1965, which was a continuation of application Serial No. 360,053, filed April 15, 1964 (now Patent No. 3,200,609) itself a continuation-in-part of application 132,757 filed August 21, 1961, and now abandoned.

This invention relates to room air conditioning apparatus. Room air conditioning apparatus, as the term will be used herein, comprises two heat exchanger blocks co-operating with a compressor to form a refrigerator wherein one block functions as the condenser and the other the evaporator.

"Air conditioning" as the term is used herein is understood to include three modes of operation:

(a) Cooling of room air; in this mode air to be supplied to the room is passed through the heat exchanger which functions as the evaporator while air from the exterior is circulated through the heat exchanger which functions as the condenser to get rid of waste heat therefrom.

(b) Heating of room air; in this mode room air is circulated through one heat exchanger and air from the exterior through the other heat exchanger as before, but the heat exchanger of the room-facing unit functions as the condenser and the other the evaporator, so that the apparatus acts as a heat pump.

(c) Dehumidifying of room air; in this mode room air is circulated first through the heat exchanger functioning the evaporator so that it is cooled and drops part of its moisture, and then through the condenser so as to be reheated.

Apparatus functioning in any one of these modes is known. One main object of the invention is to provide apparatus capable of operating alternatively in at least two of these modes.

With this object in view, the invention in one broad aspect provides room air conditioning apparatus comprising a compressor, two heat exchanger/blower units, one unit in operation facing the room and the other the exterior each comprising a heat exchanger block and a blower to cause a stream of air to pass through the block. The blower of the room-facing unit is capable of taking air from and discharging it to the room and the blower of the exterior-facing unit is capable of taking air from and discharging it to the exterior, at least two portions of said blocks being in operation connected in a closed refrigerant circuit with the compressor to form a refrigeration apparatus wherein one of said heat exchanger block portions functions as a condenser and the other an evaporator. The invention also incorporates means to interchange the function of at least portions of said heat exchanger blocks whereby to select between at least two alternative modes of operation, out of the three modes mentioned above. The expression "facing" in the above implies an association or co-operation of a particular element with the room or exterior, and not necessarily any particular physical arrangement.

In one main form of the apparatus, the room-facing heat exchanger block is in two portions one on the suction side and one on the pressure side of the respective blower, and said function interchanging means includes a changeover valve in the refrigerant circuit which in one position causes the whole of one heat exchanger block to function as a condenser and the whole of the other heat exchanger block to function as an evaporator, and in another position causes the suction side portions of said room-facing heat exchanger block to function as an evaporator and the pressure side portions of said room-facing heat exchanger block to function as a condenser. This arrangement can operate in the room air cooling or heating mode when the changeover valve is in said one position (which of these modes depending on whether the room-facing heat exchanger is then the evaporator and the other the condenser, or vice versa) and alternatively in the dehumidifying mode when the changeover valve is in said other position. In the latter condition the exterior-facing heat exchanger/blower unit can be out of service entirely, or can be used to supply air from the exterior into the roof-facing unit.

In another preferred form of the apparatus, the said function-interchanging means includes a changeover valve in the refrigerant circuit which in one position causes the exterior-facing heat exchanger block to function as a condenser and the room-facing heat exchanger block to function as an evaporator and which in another position causes the exterior-facing heat exchanger block to function as an evaporator and the room-facing heat exchanger block to function as a condenser. This arrangement in its simplest form provides for operation alternatively in the room air cooling or room air heating modes. However the function interchanging means may further comprise air flow ducts and control means therefor which in one position close the ducts and in another position cause the blowers to take air from the room and cause it to flow through said heat exchanger blocks in turn and discharge it into the room. This enables the apparatus to function also in the room air dehumidifying mode, as well as in the other two modes. However, these air flow ducts and control means therefor can also be used without a refrigerant circuit changeover valve, in which case the apparatus would be capable of operation in one or other of the room air heating or cooling modes on the one hand, or in the dehumidifying mode on the other.

In yet other forms of the invention, the apparatus is in the form of a self-contained unit and having said heat exchanger/blower units in a common casing and said function interchanging means has the form of means mounting the casing for swinging movement about a vertical or a horizontal axis, whereby in one position of the casing a given one of said heat exchanger/blower units faces the room and the other faces the exterior, and in another position of the casing said other heat exchanger/blower unit faces the room and said given one unit faces the exterior.

My above-mentioned prior application Serial No. 477,756 and patent discloses a heat exchanger/blower unit based on the concept of inducing the air flow through a rectangular heat exchanger block by means of a cross-flow blower disposed opposite thereto having its rotor parallel to one side edge of the block, the blower being such as to turn the air flow through an angle exceeding 90° between inlet and outlet areas disposed both on the same side of the apparatus. The air may thus be made to flow through the heat exchanger over substantially the whole area thereof; flow between inlet and outlet may be made to take place at least approximately in planes perpendicular to the rotor axis, the deflection of flow in such planes occurring at least to a large extent within the rotor and without the energy losses associated with ducting.

A cross-flow blower as above mentioned is understood herein to comprise a bladed cylindrical rotor and guide means co-operating with the rotor on rotation thereof to induce a flow of air from an entry side of the rotor through the path of the rotating blades to the interior of the rotor and thence again through the path of the rotating blades to a discharge side of the rotor.

In the heat exchanger/blower unit mentioned in the penultimate paragraph, the heat exchanger can be on the inlet side only of the cross-flow blower, or on the outlet side only; alternatively the heat exchanger and blower can be arranged for flow from the inlet area to the blower through one part of the heat exchanger, and from the blower to the outlet through the other part of the heat exchanger. The inlet and outlet areas may be separated in space from the heat exchanger. However the inlet area, or the outlet area, may be constituted by the frontal area of the heat exchanger itself, or the frontal area may provide both inlet and outlet areas.

An important further appreciation also disclosed in my earlier applications is that the rotor of the cross-flow blower may advantageously be located opposite one side edge of the heat exchanger; the rear wall of the apparatus may then define with the end walls and the heat exchanger an air circulation space which is wider at said one side edge, where it contains the rotor, than at the opposite side of the block. Not only is this very approximately triangular circulation space conducive to efficient air flow through the block (especially having in mind the flow-turning characteristics of the blower) but it also provides a particularly compact form of apparatus leading to its advantageous adoption in room air conditioner units. Thus a room air conditioner unit may comprise a casing of block-like form, such as may readily be built into a wall, having a main compartment with end walls and partition walling extending between the end walls and slantwise through the height of the compartment to define two air circulation spaces, one facing into the room and the other facing the exterior, each having a narrower and a wider part, the narrower part of one being opposite the wider part of the other. Two heat-exchanger/blower units may be provided in these spaces, with the rotor of each in the wider part of the respective space.

All the above-mentioned concepts of my earlier invention may advantageously be utilized in various preferred embodiments of the present invention, as will appear from the description which follows.

It is to be understood that the invention is not limited to air conditioning apparatus having means to interchange the functions of portions of the heat exchanger blocks; for example it includes also room air dehumidifying apparatus which need not be adapted for operation in any other mode. The dehumidifying apparatus in this aspect of the invention may comprise a compressor, a casing having a rear wall and end walls and defining an air circulation space, first and second rectangular heat exchanger blocks extending across the front of the casing with their longer sides between the end walls and substantially closing said space, a cylindrical bladed rotor in said air circulation space extending between said end walls and being mounted for rotation about an axis parallel to the longer sides of said blocks, guide means including a wall extending towards the rotor from between the blocks, said guide means co-operating with the rotor on rotation thereof to induce a flow of air through the first block into the air circulation space, twice through the path of the rotating blades of the rotor and out of the air circulation space through the second block, the first and second blocks being connected with the compressor in a closed refrigerant circuit to form a refrigerator wherein the first block functions as an evaporator and the other as a condenser.

The above-mentioned and further features objects and advantages of the invention will be evident from the following description of various embodiments thereof given by way of example only with reference to the accompanying somewhat diagrammatic drawings, in which:

FIGURE 1 is a vertical cross-sectional view of a first form of room air conditioner unit having a changeover valve in its refrigerant circuit to adapt it to function either for room air cooling or for dehumidifying room air;

FIGURE 2 is a longitudinal vertical section of the FIGURE 1 unit;

FIGURES 14, 15 and 16 are sectional perspective views of a room air conditioner unit having a refrigerant circuit changeover valve and also ducting and control means therefor adapting the unit to function alternatively for room air cooling (FIGURE 14) or room air dehumidifying (FIGURE 15) or for heating room air (FIGURE 16);

FIGURE 17 is a vertical longitudinal section of a further form of room air conditioner unit which has no changeover valve in its refrigerant circuit but which has a casing pivotable through 180° about a horizontal axis between two positions, the unit being thereby adapted alternatively for room air cooling or heating;

FIGURES 18 and 19 are vertical cross-sectional views of the FIGURE 17 unit showing the two positions respectively of the casing;

FIGURE 20 is a view similar to that of FIGURE 17 and showing a modified form of the air conditioner of that figure, having a casing pivotable about a vertical axis between two positions;

FIGURE 21 is a plan view of the FIGURE 20 unit;

FIGURES 22 and 23 are views similar to those of FIGURES 18 and 19;

FIGURE 24 is a front elevation of vertically pivotable air conditioner unit similar in various respects, apart from the refrigerant circuit changeover valve, to the unit of FIGURES 14 to 16 and capable of operation in the same three modes as that unit;

FIGURE 25 is a sectional plan view of the FIGURE 24 unit, and

FIGURE 26 is a vertical cross-sectional view of the FIGURE 24 unit.

Figure 3:
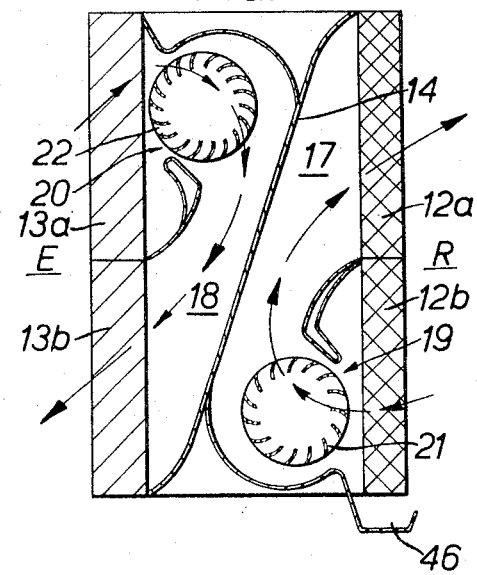
FIGURES 3 and 4 are respectively a schematic cross-section of the FIGURE 1 unit and a diagram of the refrigerant circuit thereof, illustrating operation of the unit in the room air cooling mode.

Referring first to FIGURES 1 and 2 the room air conditioner unit there shown has the form of a block 1 having a pair of opposite sides 2, 3 which on installation of the unit are directed respectively towards the room R and towards the exterior E. A rectangular casing 4 provides horizontal top and bottom wall 5, 6, vertical end walls 7, 8 and a vertical partition wall 9 parallel and close to the end wall 7 which divides the block 1 into a smaller and a larger compartment which compartments are designated respectively 10, 11. Rectangular heat exchanger blocks 12, 13 are disposed in the larger compartment 11 at either side of the block: both heat exchanger blocks 12, 13 extend over the whole distance between the end walls 8, 9 of the compartment 11 and both are sub-divided into equal upper and lower portions 12a, 12b, 13a, 13b. An intermediate or partition wall 14 extends generally obliquely through the larger compartment 11 from the upper inside edge 12c of the heat exchanger block 12 to the lower inside edge 13c of the heat exchanger block 13.

Curved wall portions 15, 16 fair into the partition wall 14 near top and bottom thereof and extend to the upper and lower casing walls 5, 6 adjacent top and bottom inner edges 13d, 12d of the heat exchangers 12, 13, respectively. The partition wall 14 and wall portion 16 define with the end walls of the compartment 10 an air circulation space 17. The partition wall 14 and the wall portion 15 define with the end walls a second air circulation space 18 separate from the first.

Within each air circulation space 17, 18 at the wider part thereof is disposed a cross-flow blower designated generally 19, 20 respectively and comprising a bladed cylindrical rotor 21, 22 rotatably mounted as will be explained below and extending adjacent and parallel to the horizontal edge 12d, 13d of the respective heat exchanger block 12, 13, and guide means co-operating with the rotor but well spaced therefrom. Each rotor comprises a series of forwardly curved blades 21a, 22a extending parallel to the rotor axis and arranged in a ring thereabout, the blades being supported between end discs 21b, 22b. Each blower rotor 21, 22 is substantially equal in length to the respective edge 12d, 13d. In each blower 19, 20 the guide means comprises a guide wall 23, 24 extending inwardly towards the respective rotor 21, 22 from half-way in the height of the respective heat exchanger 12, 13 (where the guide wall separates the upper and lower portions 12a, 12b; 13a, 13b thereof) and terminating in a portion 25, 26 return-bent towards the heat exchanger and defining with the rotor 21, 22 a gap: in the construction illustrated this converges slightly with the rotor in the direction of rotation thereof shown by the arrow 27, 28 but the gap may instead be parallel. The guide means further includes the adjacent wall portion 16, 15 on the side of the rotor 21, 22 opposite the respective return-bent guide wall portion 25, 26. The rotors 21, 22 are entirely without interior obstruction in the construction illustrated, though a shaft of small diameter can be used at the cost of some loss of efficiency. The rotors 21, 22 are driven in the direction of the arrows 27, 28 by means of a motor 29 located in the smaller compartment 10; the motor drives the rotor 21 direct and the rotor 22 by means of a belt 29a. The rotor 21 has one end disc 21b directly supported on the motor shaft and the other end disc mounted on a bearing (not shown) in a wall 8a parallel and close to the casing end wall 8. The rotor 22 has one end disc 22b rigid with a pulley wheel 22c over which the belt 29a is trained; this end disc is supported by a bearing (not shown) mounted on the wall 9 while the other end disc is supported on a bearing (not shown) mounted on the wall 8a.

In operation, the rotors 21, 22 co-operate with their respective guide means to set up a vortex having a core region, indicated at V, which interpenetrates the path of the rotating blades of the rotor adjacent the guide wall portions 25, 26. Air is induced to pass from a suction or entry region S through the path of the rotating blades of the rotor to the interior thereof and thence again through the path of the rotor blades to a pressure or discharge region P: by reason of the vortex flow takes place along flow lines, indicated at F which are strongly curved about the vortex core region V to the extent that, in passing through the rotor, the major part of the flow undergoes a change in direction well in excess of 90°.

On the room side, air passes through the lower portion 12b of the heat exchanger block 12, through the rotor in the manner described, up through the diffuser D1 formed between the guide wall 23 and the partition wall 14 and thence through the upper heat exchanger block portion 12a. The heat exchanger block portions 12b, 12a respectively define inlet and outlet areas for the air circulation space 17.

On the exterior side, the air passes through the upper heat exchanger block portion 13a, through the rotor in the manner described, through the diffuser D2 formed between the guide wall 24 and the partition wall 14, and thence through the lower heat exchanger block portion 13b. The heat exchanger block portions 13a, 13b define the inlet and outlet areas for the air circulation space 18.

Since each rotor 21, 22 is equal in length to one side edge of the respective heat exchanger blocks 12, 13a, 13b the air flows through the blocks and through the associated air circulation spaces take place substantially along planes which are perpendicular to the rotor axis, and the change in flow direction occurs mainly in the rotor, due, as explained, to the vortex.

A sump 46 to collect condensed moisture is formed in the bottom wall 6 of the casing below the heat exchanger block 12.

As will be seen from FIGURE 1, the room air conditioner unit above described can readily be installed in a rectangular aperture in a wall W with only a shallow projection on the room side. The room air conditioner unit described can of course be installed in other places besides in a wall: thus it may be installed in a window, where its moderate depth is also an advantage.

Figure 4:
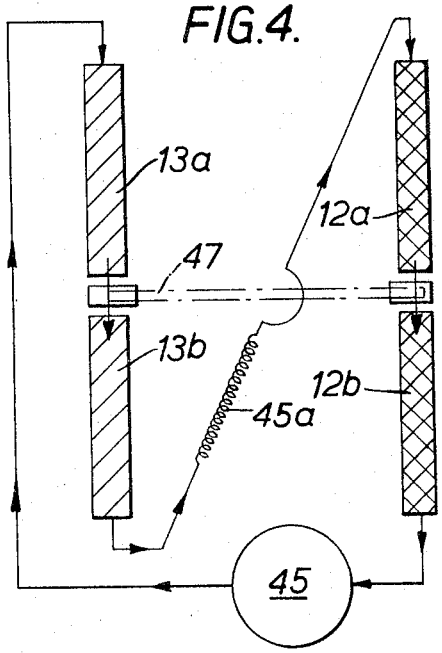

A motor-driven compressor 45 within the smaller compartment 10 within the casing is connected with the portions of the heat exchanger blocks 12, 13 in a closed refrigerant circuit apparatus, as will be explained. The circuit includes the usual capillary indicated at 45a (FIGURE 4). In accordance with the invention the circuit includes also a changeover valve designated generally 47 and shown schematically in FIGURE 4 and in more detail in FIGURES 7 and 8.

In the figures which follow, the heat exchanger block portions are shown diagrammatically; a block portion acting as condenser will be single-hatched and a block portion acting as an evaporator will be cross-hatched.

FIGURES 3 and 4 show the heat exchanger portions 12a, 12b, 13a, 13b of FIGURE 1 connected through the changeover valve 47 so that the portions 12a, 12b act as evaporators and the portions 13a, 13b as condensers. Thus after leaving the compressor 45 the refrigerant passes through the condenser heat exchanger portions 13a, 13b in succession and gives up heat to the air from the exterior circulated through the air circulation space 18; the refrigerant then traverses the capillary 45a and evaporates in the evaporator heat exchanger portions 12a, 12b thereby cooling room air circulated through the air circulation space 17.

Figure 5:
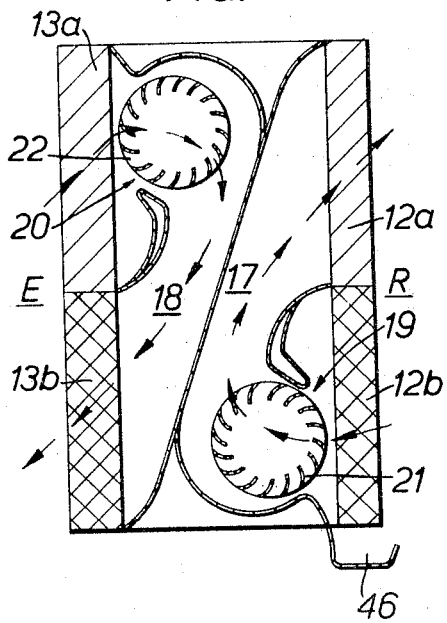
FIGURES 5 and 6 are views similar to those of FIGURES 3 and 4 illustrating operation of the FIGURE 1 unit in the room air dehumidifying mode.
Figure 6:
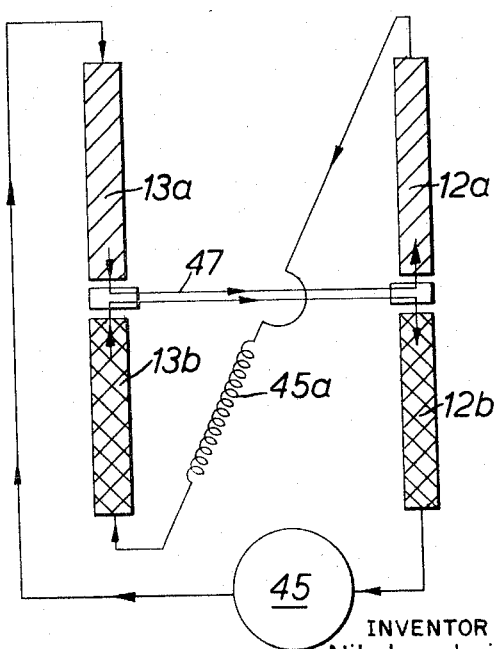

FIGURES 5 and 6 show the same apparatus with the changeover valve 47 differently positioned, so as to connect the heat exchanger portions 12a, 13a as condensers and the portions 12b, 13b as evaporators. Humid room air entering the circulation space 17 is cooled below the dew point by the evaporator heat exchanger portion 12b and deposits moisture which finds its way to the sump. The room air is subsequently heated again by the condenser heat exchanger portion 12b on its return into the room. The apparatus thus functions as a dehumidifier for room air.

Figure 7:
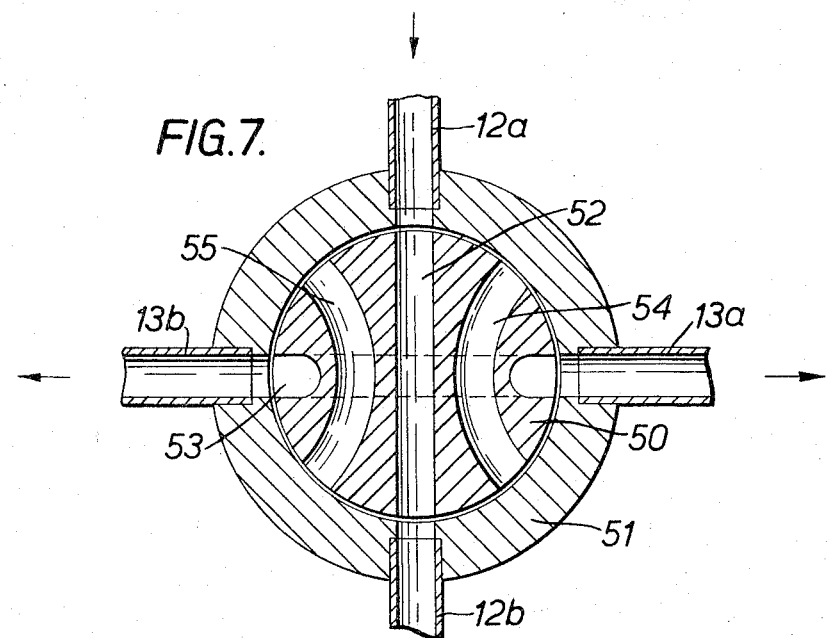
FIGURES 7 and 8 are cross-sectional views showing two alternative positions of a changeover valve such as may be used in the unit of previous figures.
Figure 8:
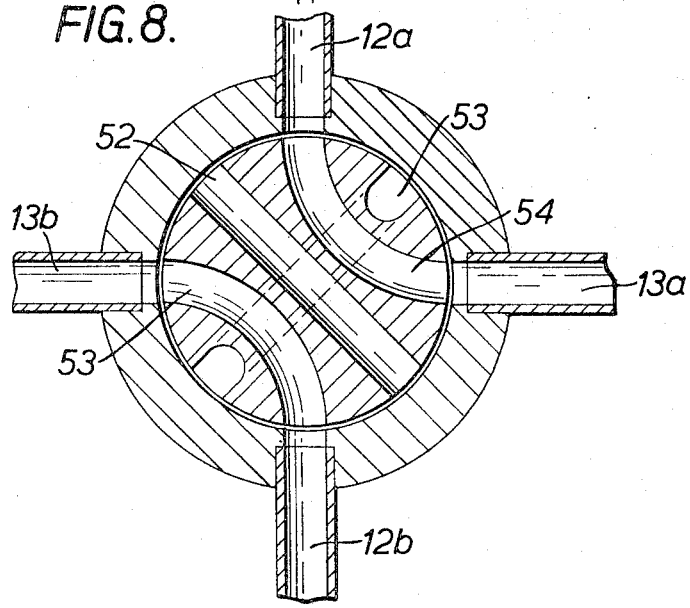

Turning now to FIGURES 7, 8, the changeover valve 47 comprises a cylindrical valve body 50 rotatable in sealing engagement within a housing 51. Radial bores are formed in the housing 51 at 90° angular intervals and are connected with the heat exchanger portions 12a, 12b, 13a, 13b. The bores are designated by the references of the heat exchanger portion to which they are connected, distinguished by a prime. The valve body 50 has four bores therein, two diametral bores 52, 53, at right angles, the middle part of one being offset to clear the other bores, and two arcuate bores 54, 55 terminating on the surface of the body midway between the terminations of the diametral bores.

FIGURE 7 shows the position of the valve body 50 for the connection of the heat exchanger portions 12a, 12b, 13a, 13b illustrated in FIGURES 3 and 4, while FIGURE 8 shows the position of the valve body for the connections illustrated in FIGURES 5 and 6.

It will be seen that in FIGURES 5 and 6 the heat exchanger portions 13a, 13b are operative to first heat and then cool exterior air circulated through the air circulation space 18, which in itself serves no useful purpose.

Figure 9:
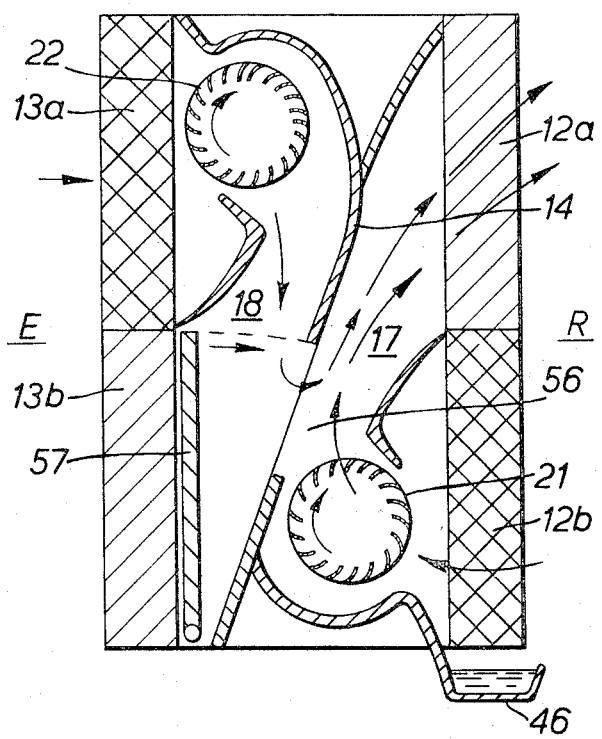
FIGURE 9 is a view similar to FIGURE 5 showing a variant of the FIGURE 1 air conditioner unit.

FIGURE 9 shows a modification of the apparatus of previous figures where the partition wall 14 has an opening 56 midway in its height and a pivoting flap 57 is provided which is movable between a first position (shown in full lines) blocking flow through the heat exchanger portion 13b and permitting communication between the air circulation spaces 18, 17 through the opening 56, and a second position blocking the opening and forming a continuation of the wall 14.

In addition, the heat exchanger block portions 13a, 13b one in the room air dehumidifying mode of operation connected in the refrigerant circuit to form an evaporator and a condenser respectively.

With the flap 57 in its closed position and the refrigerant circuit connected as shown in FIGURE 4 the apparatus of FIGURE 9 functions to cool room air as described with reference to FIGURES 3 and 4. When, as illustrated in FIGURE 9 the apparatus operates to dehumidify room air, circulation of room air takes place through the circulation space 17 as illustrated in FIGURES 5 and 6; however the flap may be moved to its first position or some intermediate position to introduce cooled air from the exterior into the room through the opening 56. It may be desirable to make the rotor 22 run faster than the rotor 21, as by reducing the size of the driven pulley, so as to ensure that the pressure in the space 18 is greater than that in the space 17.

Figure 10:
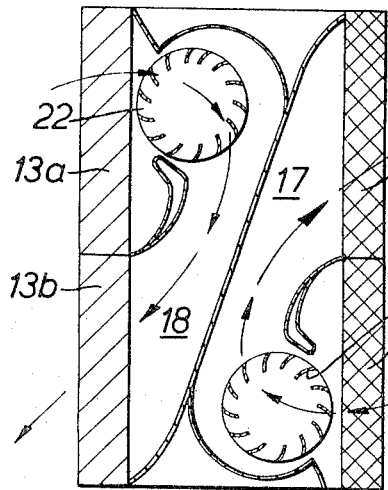
FIGURES 10, 11, 12 and 13 are views similar to FIGURES 4 to 8 showing a further form of room air conditioner unit having a refrigerant circuit changeover valve and adapted to function alternatively for room air cooling or dehumidifying.
Figure 11:
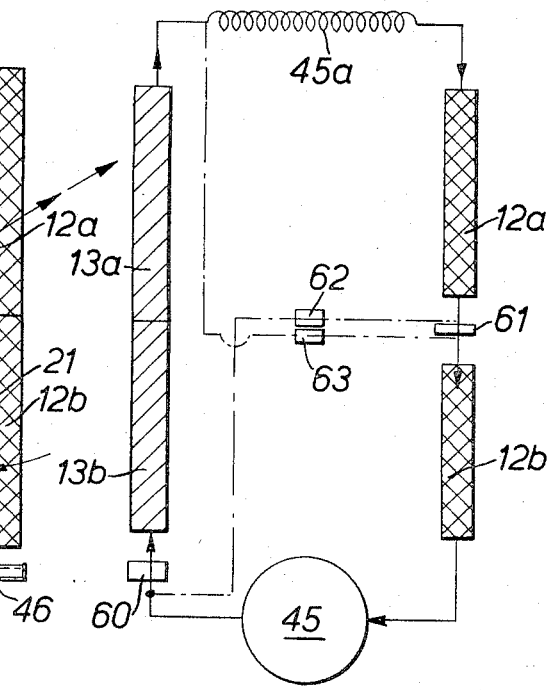
Figure 12:
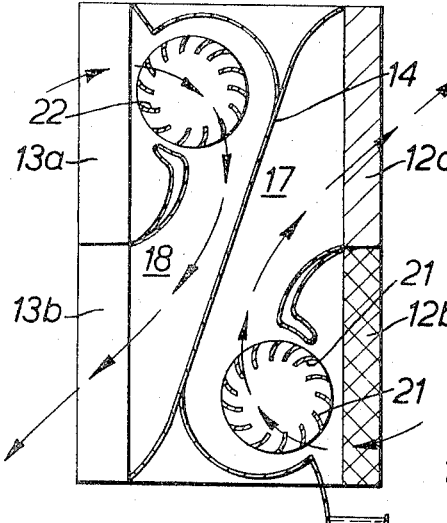
Figure 13:
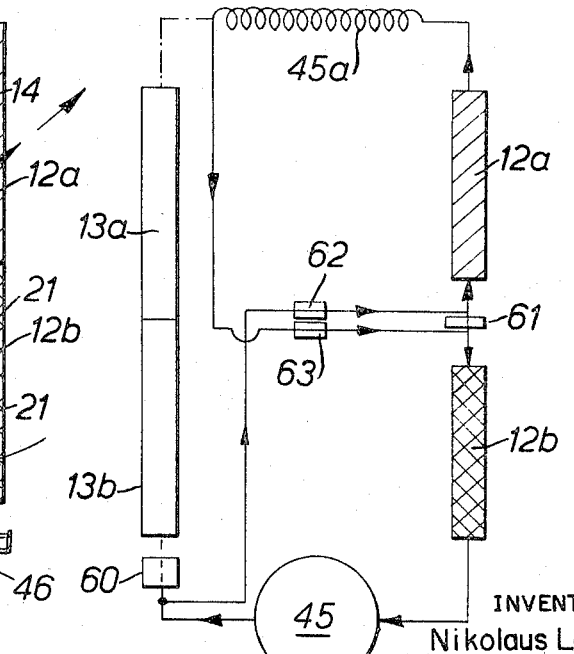

FIGURES 10 to 13 correspond to FIGURES 3 to 6 and show a modified form of the apparatus of those figures. The same references will be used for similar parts, which will not need further description. As before, the first two figures, FIGURES 10 and 11, show the apparatus functioning to cool room air and the other two figures show the apparatus dehumidifying room air. The apparatus of FIGURES 10 to 13 is chiefly distinguished from that of the earlier figures by a modified interconnection of the heat exchanger portions 12a, 12b, 13a, 13b, effected by a modified changeover valve means, comprising in effect four valve elements 60, 61, 62, 63 which may be assembled into a single composite valve similar to that illustrated in FIGURES 7 and 8. With valve elements 60, 61 open and valve elements 62, 63 closed as shown in FIGURES 10 and 11 the apparatus functions in the same manner as that of FIGURES 3 and 4 to cool the room air. By opening valve elements 62, 63 and closing elements 60, 61, as illustrated in FIGURES 12 and 13, the heat exchanger portions 13a, 12b are put out of circuit entirely, and portion 12a acts as a condenser and portion 12b as evaporator whereby to dehumidify room air as explained with reference to FIGURES 5 and 6. As explained with reference to FIGURE 9, an opening can be provided in the partition wall 14 to introduce exterior air into the room.

While the embodiments of the invention so far described provide apparatus operating alternatively in the room air cooling and dehumidifying modes, it will be understood that the apparatus could readily be adapted to operate alternatively in the room air heating or dehumidifying modes. Also, by simply changing over the functions of the heat exchangers 12 and 13 the apparatus could operate alternatively in the room air heating or cooling modes: the same applies to any of the embodiments of any aforementioned prior application.

The apparatus of FIGURES 14 to 16 has many features in common with that described specifically with reference to FIGURES 1 and 2, and the same references will be used for similar parts. In FIGURES 14 and 16, a casing 100 of cubic form is shown built into a wall W with one side 2 facing the room R and the other side 3 the exterior E. The casing 100 is divided into a main and a subsidiary compartment as described with reference to FIGURES 1 and 2, the former having spaced inner and outer top walls 5a, 5b and spaced inner and outer bottom walls 6a, 6b and being divided by a slanting partition wall 14 into air circulation spaces 17, 18. In the wider part of each circulation space 17, 18, is mounted a cylindrical bladed rotor 21, 22 extending the length thereof. Arcuate walls 15, 16 fair into the partition wall 14 and extend around each rotor 21, 22 to the inner top and bottom wall 5a, 6a respectively.

A rectangular heat exchanger block 12, 13 is mounted vertically in each air circulation space 17, 18 set somewhat back from the respective side 2, 3 of the casing 100 and extending over the length of the larger compartment thereof. The block 12 extends upward from closely adjacent the inner bottom wall 6a; the block 13 extends downwards from the inner top wall 5a. Both blocks 12, 13 terminate somewhat short of the respective rotor 21, 22 and mount a guide wall structure 23, 24 extending towards it. The guide wall structures 23, 24 and arcuate walls, 15, 16 co-operate with the respective rotors to form cross flow blowers 19, 20, each wall structure and arcuate wall forming guide means co-operating with the rotor to cause air flow therethrough in the manner described with reference to FIGURE 1.

A guide wall 101 extends from a line 102 at the side 2 of the casing 100 adjacent but spaced from the inner bottom wall 5a thereof, upwardly and inwardly to the top of the heat exchanger block 12, where it fairs into the guide wall structure 23. An expanded metal grille 103 covered by a loosely-woven fabric 104 or other permeable ornamental material extends over the length of the air circulation space 17 at the room side 2 and from the inner top wall 5a to the line 102, and forms the inlet 105 to this space. The outlet 107 to this space is defined between the guide wall 101 at the line 102 and the adjacent edge 108 of a side wall portion 109 upstanding from the outer bottom wall 6b and terminating opposite the inner bottom wall 6a.

The exterior side 3 of the casing 100 has an imperforate middle portion 110 defining, with the outer bottom wall 6b an inlet 111 to the air circulation space 18 opposite the rotor 22 therein, and with a depending side wall portion 110a terminating at an edge 110b opposite the inner top wall 5a, an outlet 112 to that space, both inlet and outlet extending over the whole length thereof. A series of pivoting louvres 113 extend horizontally over the length of the inlet 111. The guide wall structure 24 fairs into the bottom edge of the side wall portion 110. An outlet guide wall 114 extends from the bottom of the heat exchanger block 13 to the top of the side wall portion 110.

The inner bottom wall 6a terminates in spaced relation to the side wall portion 109 and defines with the outer bottom wall 6b a duct 115 extending from the region 116 of the air circulation space 17 downstream of the heat exchanger 12 therein and immediately within the outlet 107 to the region 117 of the air circulation space 18 immediately within the inlet 111 thereof and upstream of the rotor 22. A flap 118 pivoted at the edge 108 of the side wall portion 109 is movable to close either the duct 115 (FIGURES 14 and 16) or the outlet 107 of the air circulation space 17 (FIGURE 15). The inner top wall 5a terminates in spaced relation to the side wall portion 110a and defines with the outer top wall 5b a duct 119 leading from the region 119' immediately within the outlet to the air circulation space 18 and downstream of the heat exchanger 13 therein to an auxiliary outlet 122 at the side 2 of the casing. A flap 121 pivoted to the edge 110b of the depending side wall portion 110a is movable to close either the duct 119 (FIGURES 14 and 16) or the outlet 112 (FIG. 15) of the air circulation space 18.

A drip tray 123 is provided under the heat exchanger 12 in the gusset-shaped space 124 defined between the partition wall 14, arcuate wall 16 and inner bottom wall 6a, and the wall 14 is formed with apertures (not shown) adjacent the heat exchanger block 12 for passage of condensed water to the drip tray.

Though not illustrated in FIGURES 14 to 16, a motor to drive the rotors 21, 22 and a compressor are located in the smaller compartment of the casing 100 in the same manner as illustrated in FIGURE 2. The compressor is connected in a closed refrigerant circuit with the heat exchanger blocks 12, 13 to form a refrigerator. A changeover valve is included in the circuit to interchange the functions of the two blocks.

As illustrated in FIGURE 14, the heat exchanger blocks 12, 13 form respectively the evaporator and the condenser. Room air circulated through inlet 105, rotor 21 and the evaporator heat exchanger block 12 of the air circulation space 17 and out of the outlet 107 thereof will be cooled by exchange of heat with refrigerant in the block 12; heat is rejected to exterior air flowing through inlet 111, rotor 22 and the condenser heat exchanger block 13 of the air circulation space 18, and out of the outlet 112 thereof, by exchange of heat with the block 13. In operation in this mode the flap valves 118 and 121 are positioned to close the ducts 115 and 119.

The changeover valve in the refrigerant circuit may be set to make the heat exchanger blocks 12, 13 the condenser and evaporator respectively, as illustrated in FIGURE 16, when the apparatus functions as a heat pump. The circulation of room and exterior air takes place as described with reference to FIGURE 14; however the room air becomes heated by the block 12 acting as condenser, while heat is absorbed from the exterior air by the block 13. The flap valves once again are positioned to close the ducts 115 and 119.

The apparatus may also function as a room air dehumidifier, as illustrated in FIGURE 15. For this mode of operation, the heat exchanger blocks 12, 13 are made to function as evaporator and condenser respectively, as for room air cooling, but the flap 118 is raised to block the outlet 107 of the air circulation space 17 and open the duct 115, while the flap 121 is lowered to block the outlet 112 of the air circulation space 18 and open the duct 119. Preferably the louvres 113 are pivoted to close the inlet 111 of the circulation space 18, though this is not absolutely necessary. Air enters the inlet 105 of the air circulation space 17 and passes through the rotor 21 and heat exchanger block 12 of this space. As the block 12 functions as an evaporator, the air is cooled below the dew point and deposits moisture which finds its way into the drip tray 123. The cooled air passes through the duct 115 to the inlet region 117 of the air circulation space 18. Here the air passes through the rotor 22 and through the heat exchanger block 13, which, since it functions as a condenser, heats the air. The air returns to the room R through the duct 119 and the auxiliary outlet 122. A certain amount of fresh air can be admixed by appropriate adjustment of the louvres 113. If desired the changeover valve in the refrigerant circuit can be omitted; the apparatus is then capable of functioning only in the room air cooling or dehumidifying modes.

If a refrigerator is designed for optimum characteristics in one mode of operation, it may be that it will only operate at reduced efficiency in another mode. The invention provides embodiments which enable operation alternatively in two or more modes without any interchange of function in the refrigerant circuit of the heat exchangers or portions thereof. These embodiments, which will now be described, depend on a movement of the heat exchangers so that in one position the evaporator faces the room and the condenser the exterior, and in another position the evaporator faces the exterior and the condenser the room.

Turning now to FIGURES 17 to 19, the apparatus there shown comprises a unit generally similar to that of FIGURES 1 and 2, and designated 150, mounted within a fixed supporting frame 151 for rotation about a horizontal axis 152 by means of stub-shafts 153 extending from the casing end walls and journalled in ball bearings 154 in the frame. Parts of the unit 150 which are similar in construction and function to those of FIGURES 1 and 2 will be designated by the same reference numerals and will need no further description. Among differences between the unit 150 and that of FIGURES 1 and 2, the top and bottom walls 5', 6' are formed as portions of a cylinder centered on the axis 152 and fit with only slight clearance within similar surfaces 155 of the frame 151, so as to minimize leakage of air between the room R and the exterior E: the gaps between the cooperating surfaces can if required be provided with conventional sealing means. The motor 29 driving the rotors is mounted not in the small compartment 10, but in the gusset-shaped space 156 between the walls 16, 14 and 6'.

The heat exchanger blocks 12, 13 are permanently connected with the compressor 45 to function as evaporator and condenser respectively. In the management of FIGURE 18 the evaporator heat exchanger block 12 faces the room R and the condenser heat exchanger block 13 faces the exterior E. Air flow takes place through the respective air circulation spaces 17, 18 as explained with reference to FIGURES 1 to 3, and the room air is cooled and heat is rejected to exterior air. When the unit 150 is pivoted to the FIGURE 19 position the evaporator heat exchanger block 12 faces the exterior and the condenser heat exchanger block 13 the room, so that the apparatus functions as a heat pump to heat the room air.

The embodiment of the invention illustrated in FIGURES 20 to 23 provides a unit 160 which is once again similar to that of FIGURES 1 and 2 and which is mounted in a frame 161 for rotation about a vertical pivot axis 162 by means of stub shafts 163 mounted in bearings 164. The casing of the unit 160 has end walls formed as parts of a cylinder centered on the axis 162 and fitting closely within corresponding surfaces 165 of the frame. Once again parts of the unit 160 corresponding to those of FIGURES 1 and 2 will be designated by the same numerals. As in the previous embodiment, the motor is mounted in the space 156, but in contrast to previous embodiments, the compressor 45 is mounted beneath the main compartment, to save space. As will be understood from the description of the previous embodiment the unit 160 when in the FIGURE 22 position functions to cool room air while in the FIGURE 23 position it heats room air.

Though the units 150, 160 can be mounted centrally in the respective frames 151, 161 if desired, it is preferred to have them offset to the exterior as illustrated so as to present a flush face to the wall of the room. Both the units 150, 160 can be modified to have the compressor 45 stationary and connected to the heat exchangers by a flexible connection for the refrigerant circuit. The unit 160 can be modified to have the compressor above rather than below.

FIGURES 24 to 26 show a unit 170 similar to that of FIGURES 14 to 16, with the chief exception that it has no changeover valve in the refrigerant circuit, mounted for pivotal movement in the same manner as the unit 160 of FIGURES 20 to 23. The same references will be used as in the earlier figures, and the construction will be evident from the previous description. As in the unit 160 the compressor 45 is mounted beneath the main compartment.

In the position of the unit 170 shown in FIGURE 26 it can operate to cool or alternatively to dehumidify room air, depending on whether the flaps 118, 121 are positioned respectively to close or to open the ducts 115, 119. If the unit is turned through 180° from the FIGURE 26 position it operates as a heat pump to warm the room air, when the flaps 118, 121 are positioned to close the ducts 115, 119.

What is claimed is:

1. Air conditioning apparatus comprising a compressor, a block-like casing having a main compartment extending from side to side in the casing and having end walls, partition walling dividing said compartment into first and second air circulation spaces one at one side and one at the other side of the casing, a heat exchanger block in each air circulation space said blocks being interconnected with said compressor in a closed refrigerant circuit to form a refrigerator wherein the block in said first space forms the evaporator and the block in the second space the condenser, means defining for each air circulation space an inlet and an outlet, a fan mounted within each air circulation space to set up a flow of air from the respective inlet, through the respective block and out of the respective outlet in a first mode of operation of said apparatus, ducts within the casing extending from the first air circulation space at the outlet side of the respective fan and block to the second air circulation space on the inlet side of the respective fan and block and from the second air circulation space on the outlet side of the respective fan and block to an auxiliary outlet on the same side of the apparatus as the outlet of the first air circulation space, and flow control means to shut off said ducts in the first mode of operation of the apparatus and in a second mode of operation thereof to cause flow to take place through the inlet of the first air circulation space and through the fan and block thereof, to the second air circulation space and through the fan and block thereof, to the second air circulation space and through the fan and block thereof, and thence to the auxiliary outlet.

2. Room air conditioning apparatus comprising a compressor, two heat exchanger—blower units with one unit facing the room and the other unit facing the exterior of the room, each unit comprising a heat exchanger block and a blower to cause a stream of air to pass through the block, the blower of the room facing unit being capable of taking air from and discharging it to the room and the blower of the exterior facing unit being capable of taking air from and discharging it to the exterior, at least two portions of said blocks being in operation connected in a closed refrigerant circuit with the compressor to form a refrigeration apparatus wherein one of said heat exchanger block portions functions as a condenser and the other as an evaporator with the refrigerant flowing through the whole of the heat exchanger block of the room facing unit under all modes of operation, means to interchange the function of at least portions of said heat exchanger blocks whereby to select between at least two alternative modes of operation comprising a room air cooling mode and a room air dehumidifying mode, duct means enabling air to flow from the room when the unit is operating in the dehumidifying mode through a portion of a heat exchanger block functioning as an evaporator, through a blower and thence through a portion of a heat exchanger block functioning as a condenser, and means for removing condensate in said air flow between the heat exchanger block portions functioning as evaporator and condenser.

3. Apparatus as claimed in claim 4, including a passage leading from the exterior-facing unit to the room-facing unit for supply of exterior air to the room, and means to control said passage.

4. Apparatus as claimed in claim 2 wherein the room facing heat exchanger block is in two portions one of which acts as an evaporator under all modes of operation and which is connected to the suction side of the blower of the room facing unit with the other portion connected to the pressure side of the blower, and a changeover valve in the refrigerant circuit which in the air cooling mode of operation causes the whole of the heat exchanger block of the room facing unit to function as an evaporator and in the air dehumidifying mode of operation causes a portion of the block to function as a condenser.

5. Apparatus as claimed in claim 4 wherein said changeover valve in the dehumidifying position disconnects the heat exchanger block of the exterior facing unit from the refrigerant circuit.

6. Apparatus as claimed in claim 3 wherein the exterior facing heat exchanger block is in two portions with one portion connecting with the suction side of the blower of the unit facing the exterior and the other portion is connected to the pressure side of said blower with the portion of the block connected to the suction side functioning as an evaporator.

7. Apparatus as claimed in claim 2 wherein the unit facing the room has an air inlet opening and first and second air outlet openings through which air is discharged into the room, wherein the heat exchanger block of the room facing unit functions as an evaporator and the heat exchanger block of the exteriorly facing unit functions as a condenser and wherein the function interchange means comprises air flow ducts and control means therefor by which in one position of the control means air is caused to flow through said inlet opening, through the blower of the room facing unit, through the heat exchanger block functioning as an evaporator where it is cooled, to the suction side of the heat exchanger unit facing the exterior, through the heat exchanger block functioning as the condenser where the air is reheated and thence through said first opening where it is discharged to the interior of the room, and wherein when said control means is in the other position, it causes air to flow through said inlet opening, through the blower of the room facing unit, through the heat exchanger block functioning as an evaporator, and thence through said second opening where it is discharged to the interior of the room.

References Cited by the Examiner

UNITED STATES PATENTS

| 2,405,411 | 8/1946 | Dybvig | 62—325 |
|---|---|---|---|
| 2,498,661 | 2/1950 | Dybvig | 62—325 |
| 2,724,247 | 11/1955 | Kurtz | 62—325 |
| 2,729,072 | 1/1956 | Dybvig | 62—325 |
| 2,769,320 | 11/1956 | Kuhlenschmidt | 62—427 |
| 2,942,773 | 6/1960 | Eck | 62—426 |
| 2,952,989 | 6/1960 | Gould | 62—160 |
| 2,968,436 | 1/1961 | Coester | 230—125 |
| 2,984,087 | 5/1961 | Folsom | 62—325 |
| 3,026,687 | 3/1962 | Robson | 62—173 |
| 3,084,522 | 4/1963 | Hames | 62—325 |
| 3,096,931 | 7/1963 | Eck | 230—125 |
| 3,109,582 | 11/1963 | Braun | 230—125 |

WILLIAM J. WYE, *Primary Examiner.*